Dec. 30, 1930.  A. O. AUSTIN  1,786,728
POTHEAD FOR CONDUCTORS
Filed Jan. 16, 1925
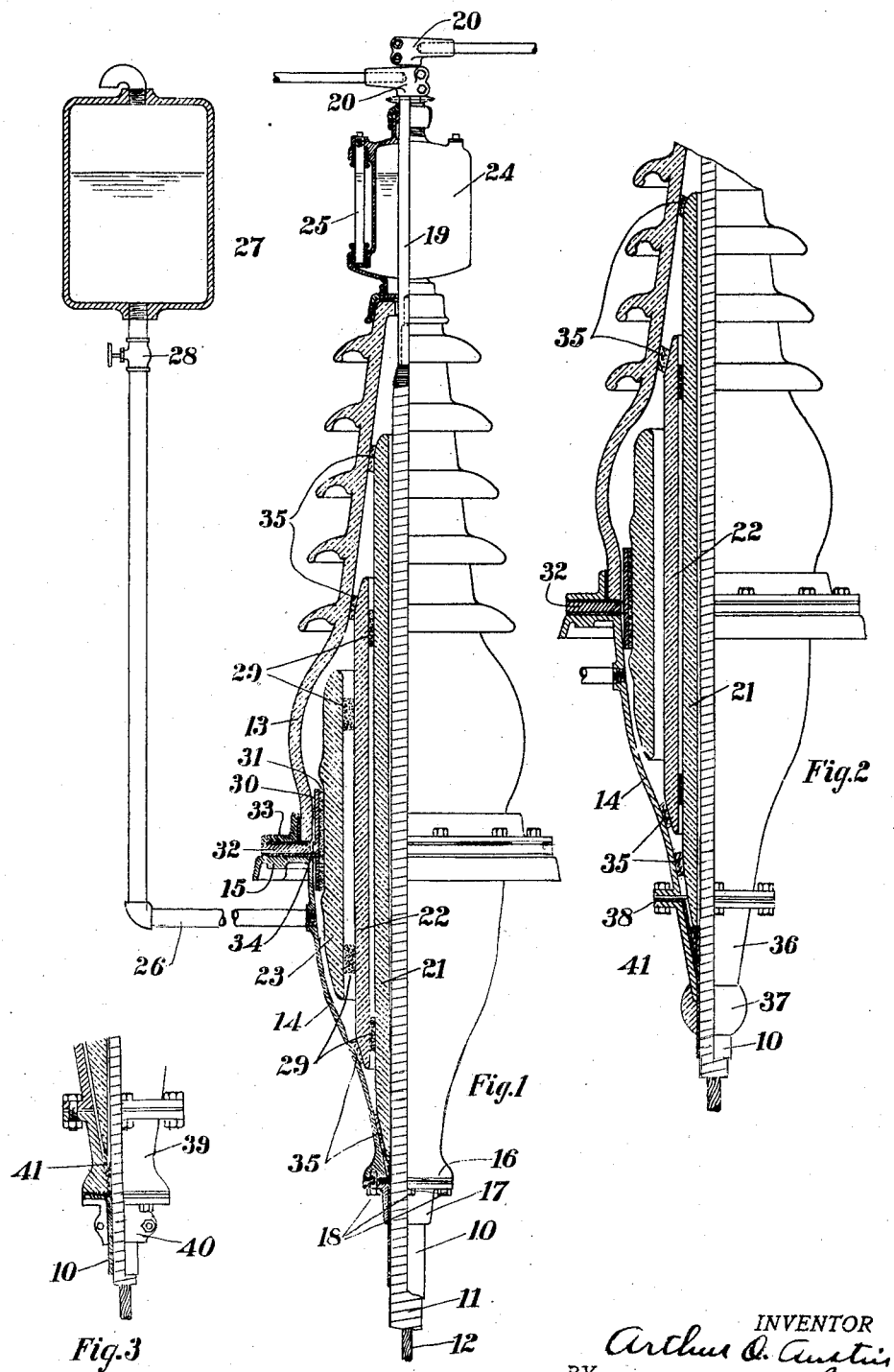

Patented Dec. 30, 1930

1,786,728

UNITED STATES PATENT OFFICE

ARTHUR O. AUSTIN, OF BARBERTON, OHIO, ASSIGNOR, BY MESNE ASSIGNMENTS, TO THE OHIO BRASS COMPANY, OF MANSFIELD, OHIO, A CORPORATION OF NEW JERSEY

POTHEAD FOR CONDUCTORS

Application filed January 16, 1925. Serial No. 2,752.

This invention relates to the form of housings commonly known as potheads used to effect a transition of a conductor from an insulated covering to an exposed position and has for its object the provision of pothead construction which shall have improved mechanical and electrical qualities, and which shall be efficient and reliable of operation.

The invention is exemplified in the combination and arrangement of parts shown in the accompanying drawing and described in the following specification and it is more particularly pointed out in the appended claims.

In the drawing—

Figure 1 is an elevation partly in section showing one embodiment of the present invention.

Figure 2 is a view similar to Fig. 1 showing a somewhat modified form of the invention.

Figure 3 is a fragmentary view of a portion of a pothead showing still another modification.

In insulated cables, particularly in high voltage cables where the insulator is covered by a metallic sheath, it is usually necessary to attach the conductor to a bus or to an overhead transmission line. The high dielectric strength of the insulation around the conductor may be made very effective in the straight length of cable.

As the insulation of the cables, however, is usually made of material which will carbonize or which may be affected by the weather, it is necessary to protect the insulation at the end of the sheath and it is also advisable to raise the flash-over voltage at the end of the sheath. If the metallic sheath on the outside of the cable is stripped away, the flash-over voltage for a given length of cable, even though covered by the insulation, will be very low due to the shunting effect of the charging current. In order to protect the insulation on the end and provide insulation which will withstand the weather and increase the flash-over, it is usually necessary to equip the end of the cable with a pothead.

In the design of the pothead, particularly where the voltages are high, it is desirable to have additional insulation to re-inforce that at the end of the cable, and, at the same time, the additional insulation must be inserted between the grounded outer part in such a manner that there will not be a high concentration of electrostatic flux on the cable insulation. It is this feature, together with lack of sufficient insulation, which causes most trouble with potheads.

The present invention deals with improvements in pothead construction which permits the design and manufacture of potheads for the highest possible voltages for which a cable may be constructed. In addition to operation the design of potheads are particularly applicable for the testing of cables to obtain their electrical break-down strength.

In the drawing is shown one form of the invention in which an insulated cable, having a lead sheath 10, an insulating layer 11 and a conductor 12, is terminated with a pothead having an exposed insulating member 13 and a metal bell 14 with a supporting flange 15. A tight joint is provided between the lead sheath 10, which is drawn through the clamping ring 17 and the lower end of the bell 14 by inserting a gasket 16 between a flanged portion of the lead sheath and the lower end of the bell and clamping the parts together with bolts 18. The conductor 12 is terminated with a conducting terminal or rod 19 which is equipped with detachable sockets 20. Insulating baffles 21, 22 and 23 are located between the insulated conductor and the outer housing composed of the bell 14 and the insulating member 13. These insulating baffles serve to increase the diameter and raise the flash-over of the bushing for a given length and, at the same time, tend to relieve the insulation of the cable of electrical stress. It is evident that the insulation of the cable must be relieved of electrical stress as it nears the end, otherwise there would be a discharge to ground from the point where the insulation terminated. The insulating member 13 is provided with weather sheds shown in the drawings. These serve to prevent flash-over where the pothead is placed under conditions where it is subjected to rain and also increase the flash-over of the bushing as well as increase the length of leakage surface of the bushing or pothead.

As high voltage cables are usually made with paper insulation impregnated with a mineral oil or compound, it is advisable that the insulation be kept thoroughly impregnated. Under changes in load or temperature, there is a breathing action in the cable and it is advisable to provide excess oil or compound which can flow into the cable. The interior of the pothead is filled with oil or compound and as part or all of this filling may be removed without seriously affecting the performance of the bushing, it is seen that the bushing or pothead may serve as a reservoir for keeping the cable impregnated. Where conditions are unusually severe, it may be desirable to insure that the pothead is filled at all times, in which case it is usually desirable to supply an additional reservoir 24 with a gauge glass or other suitable means 25, for indicating the amount of compound or oil in the reservoir. In very long or very large cables, the amount of compound flowing from the pothead into the cable may be considerable. In this case a pipe 26 may be attached to a filling hole in the bell and may be extended to some terminating point and attached to a supplementary filling chamber 27. As the bell 14 and metal flange 15 as well as the cable sheath are at ground potential, the filling pipe 26 and the chamber 27 may be handled safely at any time as they carry no voltage, the only requirement being that the chamber and pipe be far enough away from the high voltage lead. The supplementary filling tank 27 may be equipped with a valve 28 so that the compound level may be controlled in the reservoir 24 by opening and closing the valve. It is evident that if the reservoir 27 is placed at the proper level and the valve 28 allowed to remain open, the level of the compound in the pothead will be controlled by the level in this tank. If the chamber is of sufficient size, the reservoir 24 may be dispensed with or need little attention. This class of construction has many advantages in that the cable may be filled at any time, even though there may be slight leaks at the joints or in the pothead, as the control can be maintained without danger to life or removing the voltage from the pothead or bushing.

In the invention as shown, the central insulating baffles 21, 22 and 23 are held together with vented joints 29 in the usual manner employed in high voltage bushings. They are attached to a ground sheath or supporting flange 30 by a joint 31. This ground sheath or supporting member has a tubular section and a radial section or flange 32 which may be clamped between the flange terminating the bell 14 and the flange 33 attached to the insulating shell 13. It is usually advisable to interpose a suitable gasket which will form an oil tight joint between the parts. In this class of construction the pothead or bushing is readily assembled and disassembled using a given outer shell and may be used for several different sizes of cables by providing the proper internal baffle system. This in some cases is an improvement over the construction where the baffle system is supported directly from the upper insulating system or the lower bell 14. The flange 32 is vented at 34 to permit passage of insulating compound between the upper and lower portions of the pothead. Packing material such as cork may be interposed between the ends of the tubes 21 and 22 and the walls of the pothead to hold the tubes in place as shown at 35.

In the form of the invention shown in Fig. 2 the inner tubes 21 and 22 are supported by the packing 35 independently of the flange 32. In this construction also a tapered attaching thimble 36 is provided which is connected to the sheath 10 by a wiped joint 37. To further secure the sheath to the pothead the sheath may be flared out in contact with the interior of the thimble 36. The upper end of the sheath is flanged at 38 and clamped to the lower end of the member 14. This arrangement permits a standard pothead to be readily adapted to cables of different sizes. To accommodate a particular size of cable it is only necessary to provide a proper sized thimble 36 and tubes 21 and 22. These parts may be removed independently of the main body portions of the pothead and suitable sized parts for any sized cable provided.

In the form shown in Fig. 3 a similar result can be secured. In this form an adapter thimble 39 is provided to which the sheath 10 is secured by a split collar 40. This split collar makes it possible to clamp the cable with sufficient force to support the cable. Insulating packing may be inserted at 41 at the lower end of the thimble 39.

I claim—

1. The combination with a conductor having a dielectric covering and an outer metal sheath, of means for preventing flashover at the termination of said sheath, said means comprising a closed casing having a portion of the outer wall thereof formed of conducting material surrounding said conductor and dielectric covering and connected with said sheath at points closely adjacent the outer surface of said dielectric covering, and forming a sharply acute angle with the surface of said covering and gradually tapered outwardly away from said surface, the divergence of said wall from said surface being gradually increased at a distance from its point of closest approach to said surface to form an outwardly curved portion of said wall.

2. The combination with a conductor having a covering of dielectric material and an outer metal sheath, of an outlet for said conductor comprising a closed housing having a tapered portion of conducting material forming one end of the outer wall thereof and surrounding said dielectric covering, means for forming a tight joint between said end and said metal sheath at the termination of said metal sheath, insulating packing interposed between the wall of said housing and said dielectric covering adjacent said joint, and a tubular dielectric member having the wall thereof tapered at one end and extending into the space between said housing wall and said dielectric covering near the end of said space.

3. The combination with a conductor having a dielectric covering and an outer metal sheath, of an outlet for said covering comprising a closed casing having an integral metal outer wall, one end of which is fitted closely about said dielectric covering and secured to said metal sheath and forming a continuation from the termination of said sheath, said housing wall being gradually tapered outwardly away from said dielectric covering, and a tubular member of dielectric material having the wall thereof tapered on its outer face at one end and extending into the space between said metal housing wall and the outer surface of said dielectric covering to a point adjacent the end of said space.

4. The combination with a conductor having a dielectric covering and an outer metal sheath, of an outlet housing for said conductor comprising a tapered tubular member having the smaller end thereof closely surrounding the outer surface of said dielectric covering and having its inner surface substantially continuous with the inner surface of said sheath, and a locking collar disposed about said sheath for clamping said sheath to said housing.

5. The combination with a conductor having a dielectric covering and an outer metal sheath, of an outlet housing for said conductor comprising a tapered tubular member surrounding said dielectric covering, a split collar clamped about said sheath, means for clamping said collar to the smaller end of said tubular housing member, said sheath being flanged outwardly and clamped between said collar and said tubular member and held thereby in position to form with said tubular member a substantially continuous outwardly flared inner surface, and dielectric material within said housing interposed between said dielectric covering and the inner wall of said housing.

6. The combination with a conductor having a covering of insulating material and an outer protecting sheath, of a closed housing having a portion of the outer wall thereof formed of plate metal enclosing a portion of said conductor and insulating material at the termination of said sheath, the wall of said housing being connected with said sheath to form an outwardly flared continuation thereof having its inner surface substantially continuous with the inner surface of said sheath, and a tubular member of dielectric material interposed within said housing and surrounding said conductor and extending to a position adjacent the connection between said housing and sheath.

In testimony whereof I have signed my name to this specification on this 13th day of January, A. D. 1925.

ARTHUR O. AUSTIN.